Feb. 11, 1941. R. B. DAY 2,231,359
TIRE AND METHOD OF MAKING SAME
Filed Jan. 10, 1936 3 Sheets-Sheet 1

Inventor
RALPH B. DAY

Feb. 11, 1941.  R. B. DAY  2,231,359
TIRE AND METHOD OF MAKING SAME
Filed Jan. 10, 1936  3 Sheets-Sheet 2

Inventor
RALPH B. DAY
By
Attorney

Feb. 11, 1941.  R. B. DAY  2,231,359
TIRE AND METHOD OF MAKING SAME
Filed Jan. 10, 1936  3 Sheets-Sheet 3

Inventor
RALPH B. DAY
By
Attorney

Patented Feb. 11, 1941

2,231,359

UNITED STATES PATENT OFFICE 2,231,359

TIRE AND METHOD OF MAKING SAME

Ralph B. Day, Akron, Ohio, assignor to Wingfoot Corporation, Wilmington, Del., a corporation of Delaware Application January 10, 1936, Serial No. 58,529

10 Claims. (Cl. 154—14)

The present invention relates to tires and a new method of making the same, and is particularly related to the building of what is known as super-balloon tires which have a rather large cross-section and a small wheel diameter.

One object of this invention is to provide a tire in which at least some of the plies found in the periphery of the finished tire are composed of cords of two or more layers of fabric superimposed upon each other in building the tire and which, in blowing up the tire to its desired cross-section, are forced into one ply at the periphery of the tire, by reason of the cords of the different original plies becoming wedged in between cords of the other plies. In other words, as the tire is blown up or otherwise expanded to its desired shape, the cords at each side of the periphery of the tire spread apart and the cords of the several plies fill the spaces between the cords of the other plies, thus giving an increased cord count in the various plies at the periphery of the tire over that which would result from expanding the single ply.

Another object of this invention is to provide a method and means for accurately determining the cord angle in a tire so that it will occupy the most efficient angle when the tire is completed.

Another object of this invention is to provide a method and means for building tires in which the various plies of fabric can be laid at the same, but oppositely disposed, angles in a tire by mechanical means, thus eliminating the errors which may result from the laying of fabric manually on a building drum when building a tire.

Another object of this invention is to provide a tire made up of a series of plies, which have substantially a similar number of cords per inch in the side walls and in the periphery of the tire without using fabric plies of different initial cord counts for the side walls and periphery, all of the cords of the plies extending from the beads over the entire arcuate portion of the tire.

Another object of this invention is to provide a means and method of forming tires with fabric layers of uniform cord count and so arranging at least two or more adjacent plies with the cords at the same angle, whereby when the tire is expanding, the cords of the different plies become partially or wholly interspersed with each other so as to cause all of the cords at the outer periphery of the tire to become aligned peripherally to form a single layer of cords, while maintaining a plural layer of cords at the side walls of the tire.

Another object of this invention is to provide a means and method of accurately aligning the cords of a given piece of fabric before placing the fabric on the drum, and maintaining the cords in alignment while the fabric is being wrapped about the drum. In carrying out this object of the invention, a means and method have been provided whereby the cords may be aligned by either using a piece of fabric of the desired extent to make one or more fabric layers on the drum, or a composite strip of the desired length made up of similar strips which have their cords aligned with respect to each other and with respect to the cords of the other strips.

Another object of this invention is to provide a fabric for building tires in which spaced cords are given a distinctive coloring or marking visible to the eye which will enable one to accurately align these cords and, due to the relatively small spacing between such distinctively marked cords, thus align within desired limits the remaining cords between the distinctive cords.

Another object of this invention is to provide a method and means for aligning strips of cord fabric in which each of the strips has the same cord count throughout their lengths from one end thereof to the other although the total number of cords in each strip may vary, due to varying lengths of strips, preferably within certain tolerance limits. By this method and means the adjacent cords of adjacent strips can be lined up accurately by suitable aligning means and thus align the intermediate cords of each strip within certain tolerance limits.

Another object of this invention is to provide suitable mechanical means for accurately laying out a cord fabric either in unitary or composite-strip form, with all the cords thereof aligned within certain tolerance limits and thereafter wrapping the cords about a tire-building drum by mechanically guiding the drum over the fabric at the desired angle with respect to the cords, so that the cords when arranged on the drum will all lie parallel to each other at the most efficient angle so that when the tire is blown up the stresses in the cords will give greater life to the tire. This means contemplates the elimination of the error, which normaly results when manually laying the cord fabric on a rotating drum without suitable mechanical means for determining the cord angle on the drum.

A still further object of this invention resides in the provision of a suitable method of building tires for accurately aligning cords on a drum at the most efficient angle and whether the drum is rolled over the fabric on an inextensible support to pick up the same or whether the fabric is wrapped around the drum in the usual manner with means for accurately aligning the cords thereon.

A further object of this invention is to provide means for blowing up the tire after it has been built on the drum to shape the tire and, in carrying out this object of the invention, I preferably employ two or more stages for blowing up the tire into its final shape and without the aid of mechanical expanding means.

A very important object of this invention is to provide a tire in which there is a uniform spacing of the cords in the side walls of the tire and also in the periphery thereof, even though the cords forming a single ply at the periphery form two or more plies in the side walls. In addition, all of the cords are maintained at the most efficient angle from one bead across the periphery of the tire to the bead on the other side so that the pull on each cord is the same as the pull on every other cord and the pull is exerted always in the same direction in each cord with respect to the axis of the tire.

Other objects of this invention will appear hereinafter as the description hereof proceeds, the novel features, arrangements and combinations being clearly set forth in the specification and in the claims thereunto appended.

Figure 5:
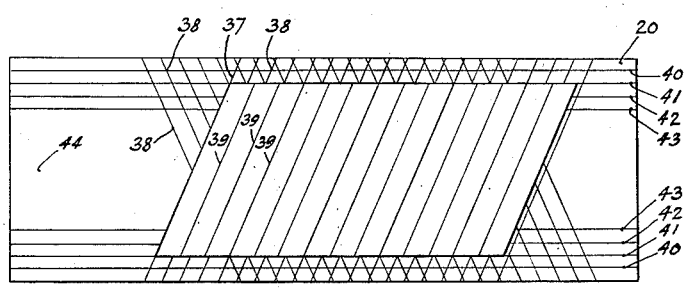
Figure 6:
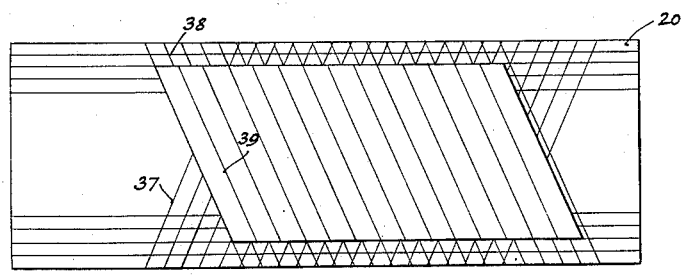
Figure 7:
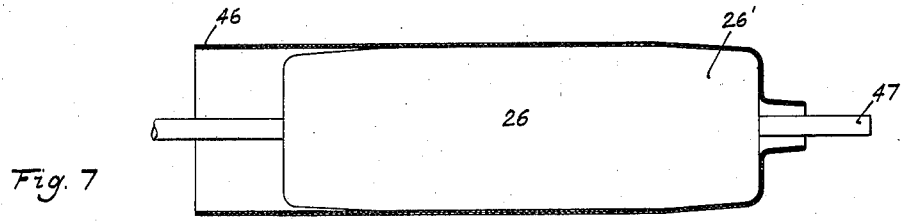
Figures 8, 9:
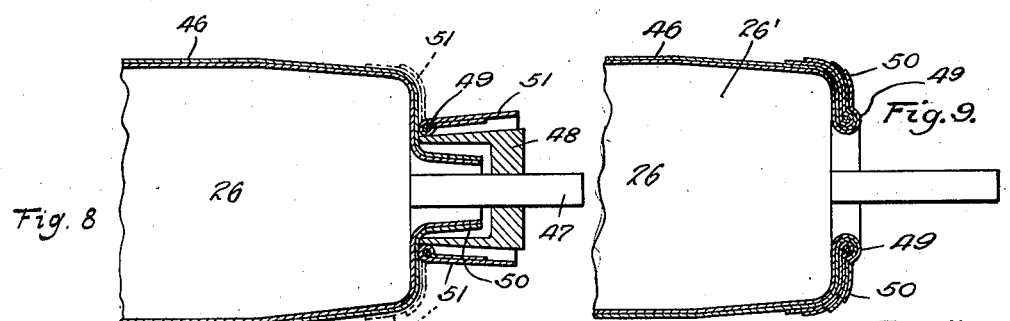
Figures 10, 11:
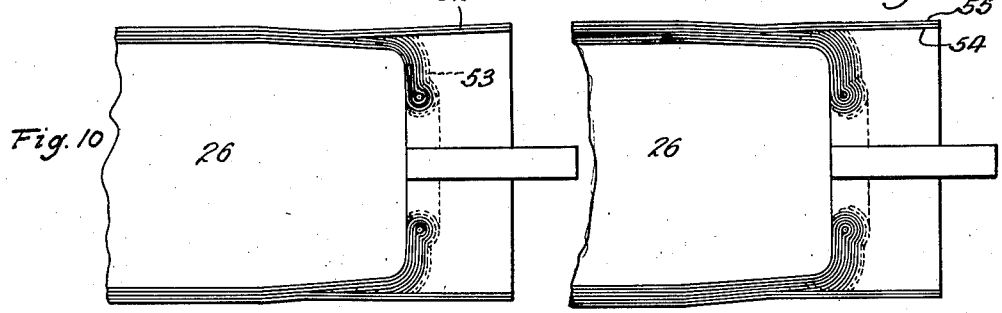
Figure 12:
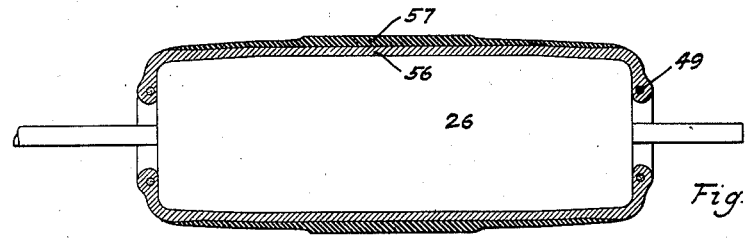
Figure 13:
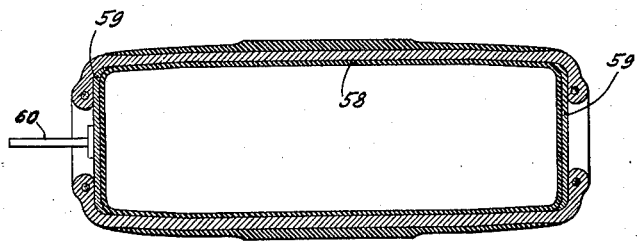

Figs. 5 and 6 indicate diagrammatically the method of laying out the fabric for different plies at the periphery of the tire;

Fig. 7 is a side elevation of a building drum with the first plural layer of cord fabric applied thereto, the latter being shown in cross-section;

Fig. 8 shows the step of applying a bead to the tire;

Fig. 9 shows the manner in which the cord plies are stitched about the bead;

Fig. 10 shows the application of the next plural layer of fabric to the tire;

Fig. 11 shows two layers of fabric applied to the tire but having their cords arranged opposite to each other;

Fig. 12 shows the tread ply applied to the tire;

Fig. 13 shows the first step in expanding the tire;

Fig. 14 shows the second step in expanding the tire;

Fig. 15 shows the final step in expanding the tire;

Fig. 16 is a plan view of the tire with the various layers partially removed to show the arrangement of the cords in the various layers; and Fig. 17 is a side view of a tire embodying my invention and showing the outer coating of the tire removed to show the arrangement of the cords in the plural layers of fabric after the tire has been expanded.

It has been the practice prior to this invention to build tires by applying successive layers of fabric to a rotatable drum by manual means, and it is very difficult in doing this to arrange the cords in the fabric at the desired angle across the drum to give the most efficient angle when the tire is expanded. In tires it is necessary to have the cords at the most efficient angle in order to increase the life of the tire and that in a specific tire the cords lie at the same angle. In order to do this the fabric must be laid over the drum with all the individual cords in the fabric parallel to each other, for it is a well-known fact that, in preparing the fabric, the cords are not maintained in absolute alignment with each other, some of the cords being crowded together and others being spaced more than desired. This is due primarily to the loose manner in which the cords are held together by the pick of the fabric or, if a pickless fabric is used, there is no pick to hold the cords in any kind of alignment and the cords can move toward or away from each other readily, thus making it extremely difficult to control these cords and have them properly aligned in the resulting fabric during the frictioning of same. Also this trouble occurs when bias cutting same and a subsequent handling.

The primary purpose of this invention is, therefore, to properly align the cords of a given piece of fabric, at least within certain tolerance limits, so that whether this cord fabric is applied to the drum manually or mechanically there is greater possibility of the cords all being properly aligned than with methods previously employed. However, I prefer to use mechanical means in applying the fabric to the drum as this eliminates human error, which in some cases may be considerable. I therefore propose to apply the fabric to a suitable flat surface on which the cords of the fabric can be so adjusted as to all lie substantially parallel to each other, at least sufficiently so as to be within the desired tolerance limits. Theoretically, this can best be accomplished by laying individual cords across the table, but, from a practical standpoint, this would take too great an amount of time and unnecessarily increase the cost of the tire, as well as increase the cost of handling of the cords, for it would be necessary to coat the individual cords with a suitable rubber coating or cut up a strip of fabric into individual cords after the fabric had been coated. This would produce perhaps greater accuracy, but for all practical purposes the method which I am about to describe and the means by which I carry out this method have been found to be sufficient.

My method contemplates the aligning of cords principally by two similar methods. The first method is the laying out of a bias-cut strip of fabric on a table provided with suitable aligning means, such as pegs or lines on the table set at the desired cord angles, then cutting the fabric into strips and aligning the end cords of each strip with the pegs or lines on the table, and finally joining the strips by overlapping about one cord of each strip with a cord of an adjacent strip to make a composite fabric strip which is to be wrapped about a building drum. Another method which I propose to employ is that of providing a fabric with spaced cords of a different coloring than the body of the fabric or otherwise distinctively marked in order that they can be readily seen. Briefly, I propose to provide a cord at about every two inches in the width of the fabric with a distinctive coloring or other marking and, when using this fabric cut on the bias, these distinctively marked cords can be aligned with markings on a table to insure that these distinctively marked cords are all parallel to each other, thus insuring within certain limits that the intermediate cords are also substantially parallel with each other and the markings on the table.

Obviously, other means may be employed than those means illustrated in this application and other similar methods within the scope of this invention can be devised, those methods described in this application being merely examples of tried methods of accomplishing this result.

Figure 1:
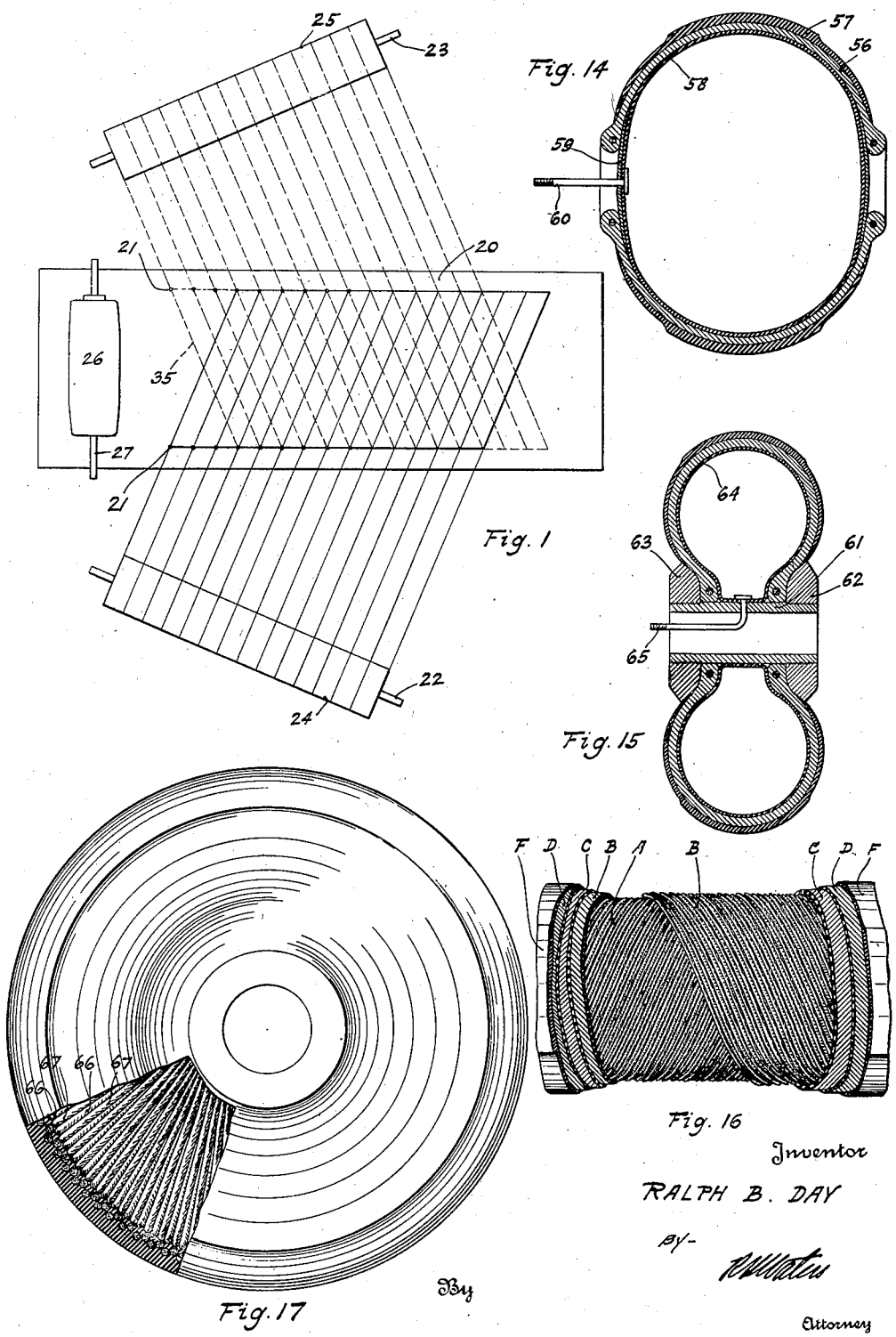
Fig. 1 illustrates diagrammatically the principle embodied in laying out the cord fabric for proper alignment of the cords.
Figure 2:
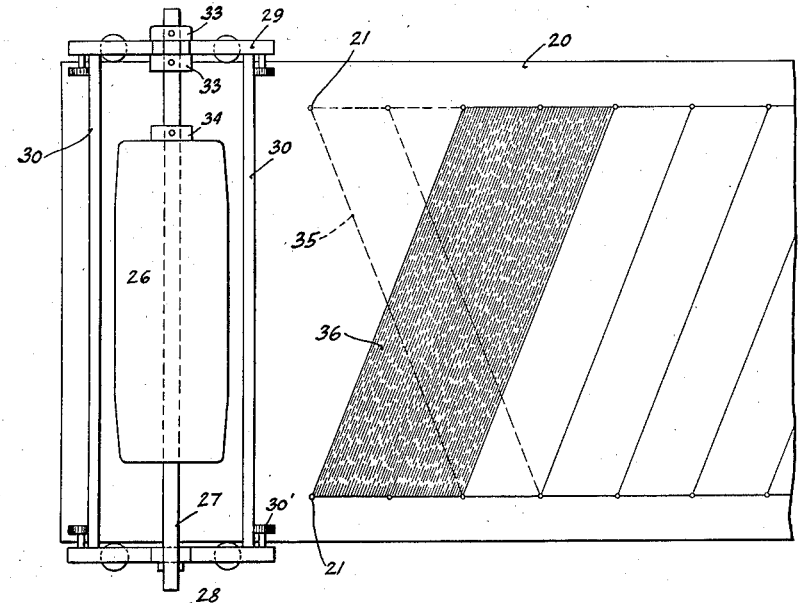
Fig. 2 is similar to Fig. 1 but indicates a plan view of a mechanical means particularly adapted for the purposes of this invention.
Figures 3, 4:
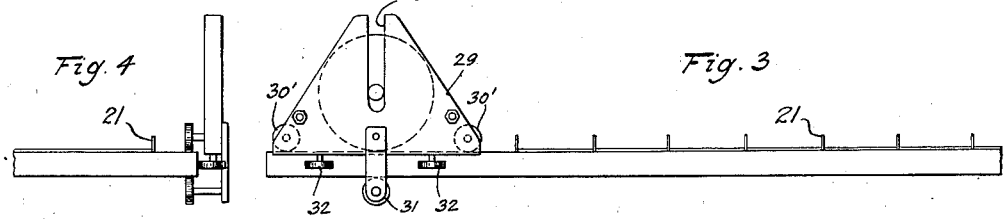
Fig. 3 is a side elevation of the mechanical means shown in Fig. 2 looking from the lower side of Fig. 2.
Fig. 4 is a fragmentary end elevation of Fig. 3 looking from the left in the latter figure.

In Fig. 1 I have illustrated diagrammatically a layout table 20 provided with parallel rows of pegs 21 arranged on opposite sides thereof. 22 and 23 represent shafts which are adapted to revolve on suitable bearings in actual practice and which support the rolls of fabric 24 and 25. There are a plurality of rolls 24 and also a plurality of rolls 25 arranged on the respective shafts 22 and 23, the overall length of all the rolls arranged on the shafts 22 and 23, respectively, being preferably such as to make a composite strip of fabric sufficient to be wrapped about a tire-building drum at least twice, the fabric-building drum being represented at 26 and being substantially cylindrical, at least throughout a portion of its length, so that it will roll accurately over the surface of the table 20 in a straight line. Preferably, in order to further insure the proper movement of the drum over the table, I provide suitable guiding means, such as shown in Figs. 2, 3 and 4, so that there is no chance of the drum slipping and being thrown out of proper alignment with the rows of pegs 21 on the table.

Assuming that the rolls 24 are to be used, the operator starts with the roll at one end, preferably at the left, and pulls on the same to bring the end thereof to the upper row of pegs shown in Fig. 1, arranging each of the strips between two pegs in the upper row and two pegs in the lower row, which determine the proper angle for the cords. Each roll of fabric has the same cord count throughout the length of the roll so that between adjacent pegs there will be a given number of cords. By making the outermost cords, of each strip taken from a roll, line up with the adjacent pegs, the intermediate cords will assume a parallel position to the lines determined by the pegs, at least sufficiently so as to be within the permitted tolerance limits. Theoretically, in order to get a perfect alignment of the cords, individual cords should be lined up between adjacent pegs all along the table, and this is within the scope of my invention but requires too much work on the part of the operator and would be quite impractical. A sufficient accuracy is obtained from using strips of fabric, substantially from two to five inches in width and more, depending on condition of fabric and tire size, and after the outermost cords are lined up with the pegs the intermediate portions of the fabric are stitched down to the table, the cords, as a result, will all assume a substantially parallel position. Having so aligned the strips taken from the various rolls, the operator then cuts the various strips of fabric along the line determined by the lowermost layer of pegs.

Instead of using a series of rolls, a single roll can be used and cut into strips by gangs of knives or a single knife as the fabric is needed, the cuts being taken between adjacent cords.

The operator thereafter takes the cylindrical drum 26, which may or may not have an inner rubber liner already wrapped thereabout. Generally this inner liner is wrapped about the drum and forms the inner surface of the completed tire. The drum is then moved longitudinally of the table, while resting by its own weight on the table so that, as it moves over the various strips of fabric, the same are picked up and are thereby arranged at the proper angle relative to the longitudinal axis of the drum ends of the strips projecting beyond the ends of the drum. If desired, and it has been found preferable in actual practice to do this, the operator overlaps the adjacent edges of the strips for about the width of one cord and stitches the edges together so that a composite strip of fabric is provided which, on expansion, will not permit a space to form between adjacent strips.

The strip of fabric, as already stated, is of a sufficient length to be wrapped about the drum approximately twice and preferably with a slight overlap of the ends. The tire is then ready for the next step in the process, which will be explained later. Before describing the next step and the succeeding steps, I wish to describe a modification of the table layout shown in Figs. 2, 3 and 4, and to explain the method of building up the first double-ply as shown in these figures and also in Figures 5 and 6.

In Figs. 2, 3 and 4, the table 20 is provided with pegs 21 similar to those shown in Fig. 1 and the building drum 26 is shown mounted on a shaft 27, the ends of which are free to move vertically in slots 28, these slots being deep enough to permit the drum to rest of its own weight on the table 20. The slots 28 are in the end brackets 29, which are held together by connecting rods 30, and guided by means of suitable rollers 30', 31 and 32, which engage the upper, lower and side faces of the table 20, respectively. As viewed in Fig. 1, it will be noted that the shaft 27 is unobstructed at its lower end so that the drum can be quickly removed therefrom. The shaft 27, however, is provided with a pair of spaced collars 33 at the upper end which straddle the upper bracket 29 to prevent longitudinal shifting of the shaft. Another collar 34 secured to the shaft 27 is used for locating the drum on the shaft, so that the drum will be centered with respect to the rows of pegs 21 when the drum is moved longitudinally of the table 20.

Instead of having the rolls of fabric 24 and 25, such as illustrated in Fig. 1, I merely provide a series of strips of equal width, which can all be taken from a single roll if desired, and I lay these strips on the table between the pegs 21 in the same manner as described with the device in Fig. 1. The drum is then moved over the fabric and the strips are picked up by the drum and become properly aligned with respect to the longitudinal axis thereof.

In connection with Figs. 1 and 2, when a succeeding double ply of fabric is to be applied to the drum, the strips are arranged at the opposite angle to those shown in these views. In Fig. 1 the strips are taken from the rolls 25 and laid between pegs 21 in the two rows of pegs, but at the opposite angle as indicated by the dotted lines 35 in Fig. 1 and, in connection with Fig. 2, the individual strips 36 are arranged at the opposite angle 35, also illustrated in dotted lines.

Instead of using pegs, such as 21, I can mark the table with suitable lines 37 and 38 arranged at the desired angles for the cords and line up the cords on the adjacent strips by means of these lines, even though the strips are not of the same width as the spacing between adjacent lines, since it is possible to line up the cords of the strips by the eye with one or others of the lines which are adjacent to the edge of the strip the lines being spaced together rather closely so that a line will always be relatively close to the edge of the strip of fabric.

With a table constructed as in Figs. 5 and 6, I can employ another method for lining up the cords of a strip of fabric. In these figures the fabric which is to be used for each double ply is taken from a roll of fabric having distinctly colored or marked cords 39 spaced about two inches from each other so as to indicate the cord ends at various positions in the width of the fabric. The fabric is then cut on the bias in the usual manner and spaced on the table 20 with the endmost edges of the fabric aligned with suitable ones of the parallel markings 37 so that the ends of the fabric are properly aligned with each other. The fabric in between the endmost cords may have cords which extend considerably out of alignment with the markings on the table, but the operator by means of the distinctively marked cords 39 can shift the fabric, which is stretchable, sufficiently to make all of the distinctively marked cords parallel to the markings 37 on the table. This having been done, the cords arranged between the distinctively marked cords will assume substantially a parallel position, at least sufficiently so for practical purposes. The drum 26 is then rolled over the table 20 to pick up the fabric as previously described in connection with Figs. 1 to 4 inclusive. When a succeeding layer of fabric of double ply is to be applied at the opposite angle, the markings 38 are used instead of the markings 37, as shown in Fig. 6.

Obviously, this invention can be utilized to line up the cords in any fabric, whether it is to be applied as a single ply or double ply, or even a partial ply, but the method is particularly applicable to tires in which two or more plies are applied to the tire at the same angle so that when the tire is expanded the cords of the various plies will become aligned in a single ply at the periphery of the tire as previously explained. Also, it is obvious that the table shown in Figs. 5 and 6 can be used with strips of fabric, such as used in Figs. 1 and 2, and the tables in Figs. 1 and 2 can be used to align a piece of fabric, such as used in Figs. 5 and 6. Numerous other means may be employed for aligning the strips on a supporting surface without departing from the spirit of this invention. In Figs. 5 and 6, it will be noted that there are pairs of lines 40, 41, 42 and 43, these being used to determine the width of the fabric strip, and are equally spaced from the center line 44 on the table. Thus, tires of different sizes can be built by the use of this table and the fabric cut to the desired widths for the different sizes by using the different pairs of lines referred to. The cord angles may be varied to suit the requirements, but it has been found in general there is one cord angle that is most efficient for tires of this nature and gives a better tire when the tire is expanded to its finished size.

The strips of fabric need not be of uniform width, especially when using a table such as that shown in Figs. 5 and 6. In other words, an operator can take a strip of bias-cut fabric and cut or tear the same into strips of widths within certain tolerance limits, say three to five inches. The strips are then placed on the table as previously described and aligned with marks 37 or 38.

I will now proceed to described the succeeding steps in the building of a tire made according to this invention.

Fig. 7 shows the double ply of fabric indicated at 46 applied to the drum with one end portion stitched down along the right-hand end of the drum, leaving a portion of the fabric protruding outwardly in the direction of the shaft 47, which is the drum-supporting shaft of a tire-building machine. This is customary practice in the building of tires and the fabric is then so stitched down as to be uniformly tucked in around the edges of the drum for, obviously, the fabric has to be gathered somewhat in stitching it down as shown in Fig. 7. After doing this, the bead of the tire is applied. This bead is provided with the usual flipper strips and is first mounted on the metal cone 48 adjacent the smaller end of the cone, as shown in Fig. 8, and this cone is then slid over the shaft 47 to position the bead 49 centrally against the end of the fabric which is stitched down against the end of the drum. The unstitched portion 50 of the double layer of fabric is arranged close to the shaft and in actual practice is wrapped snugly about the shaft, as with tape, until the bead has been applied. The cone is hollowed out on the interior thereof so as to pass over the projecting portion 50 of the fabric. The flipper strips 51 on the bead 49 are then brought up over the end and outer surface of the drum, as indicated by dotted lines in Fig. 8. The next step is to bring the ends 50 of the double layer of fabric upwardly and over the bead and flipper strips as indicated in Fig. 9.

Note that the drum 26 has tapered ends 26' which give a clearance at the portion of the drum so that when the flipper strips are stitched down, as in Fig. 9, over these tapered ends, the same will not project outwardly beyond the outermost layer of fabric on the central cylindrical portion of the drum. This is to insure that when applying succeeding layers of fabric, the drum will roll smoothly over the fabric on the table 20, as otherwise the flipper strips might cause an improper rolling of the drum and prevent the drum from resting firmly on the fabric stitched to the table.

The next step is to apply another double layer of fabric 52 to the drum 26 with the cords arranged at opposite angles to the cords in the double layer 46, the projecting ends of this double layer being brought down over the bead 49, as at 53.

With the construction which has so far been described, it is obvious that the periphery of the drum is provided with four layers of fabric, the inner two layers having the cords thereof parallel to each other and at an angle to the axis of the drum and the outer two layers are applied with the cords at the opposite angle but with the cords of the two outermost layers parallel to each other.

This process may be repeated and additional plies added, either of the double variety or the single variety, and in the present instance I have illustrated two additional layers 54 and 55 in Fig. 11 which have their cord angles oppositely arranged with respect to each other, but, if desired, I could form each of these layers as double layers. These layers can be aligned on the table, even though they are single layers, and applied to the outer surface of the tire, the same as the first double layers, so that the cords will be at the proper angle in the finished tire. Of course, these layers are again stitched down around the bead and the carcass of the tire is now ready to have the tread applied thereto. The tire carcass is indicated generally at 56 in Fig. 12, the various layers of fabric, flipper strips, etc., being omitted for simplicity. The tread ply 57 is then applied to the outer carcass of the tire and the tire is then ready to be expanded into its final shape, although, if desired, the tread may be applied after the tire carcass has been shaped.

While not illustrated here in the drawings, the drum 26 is of the collapsible variety which can be taken out piece by piece through the openings at the end of the tire. After this has been done I insert an expansible air bag 58 in the tire, as illustrated in Fig. 13, the air bag having a valve 60. In order to prevent the air bag from expanding outwardly through the open ends of the tire, I provide suitable reenforcing plates 59, either of metal or heavy fabric which are arranged internally of the tire and cover the openings at the ends of the tire.

Air under pressure is then introduced into the tire and the tire is then permitted to expand for a given period until it assumes the shape, such as that illustrated in Fig. 14. The air bag is then removed and the final shaping step is then taken. In this step I provide a mandrel 61 having a rigid collar 62 thereon and a movable collar 63 removably mounted on the opposite end thereof. The mandrel is hollow. An air bag 64 is inserted in the tire and the mandrel is then moved into a position, such as that illustrated in Fig. 15, the collar 63 not being in place at this time. The collar 63 is then applied to the mandrel and pressure is exerted to draw the bead portions of the tire inwardly toward each other until the tire is shaped substantially as shown in Fig. 15. This is done by any suitable apparatus and the collar 63, after reaching the position illustrated in the drawings, is suitably secured to the mandrel. The valve 65 extends through an opening in the side of the mandrel and out through the center thereof into a position where it is accessible for connection with an air hose. Air is introduced into the air bag and the tire is put aside for a given period of time until it is suitably shaped. It is then placed in a curing mold and cured by any desired process.

After the tire has been expanded the cords in the tire will be arranged substantially as shown in Figs. 16 and 17. During the expanding operation the cords in each of the double layers of plies move wholly or partially into a single plane, that is the cords of one ply are drawn into a position between adjacent cords of the other ply so as to form a single ply at the periphery of the tire, having twice the number of cords in the ply as would a single ply, if expanded as set forth in this specification. However, these cords, as they approach the bead of the tire become separated, at least they lie in different planes due to the fact that this portion of the tire is not expanded as much as is the periphery of the tire, and also there is not room between cords of one ply for the cords of the adjacent ply. Therefore, looking at the cords from the side of the tire, the same would be arranged somewhat as illustrated in Fig. 17, in which 66 represents the cords originally in one layer of the double-ply layer of fabric, and 67 represents the cords in the other layer of the double ply fabric. These, it will be noted, are all in a single plane at the periphery of the tire, but somewhat overlap on the side walls and bead and are entirely overlapped adjacent the bead. This is clear from an inspection of Fig. 17.

In Fig. 16 this feature is also somewhat apparent where the cords as they begin to go down over the side wall of the tire overlap somewhat instead of being in the same plane as at the periphery, which in this view is the horizontal center line of the view. In this view A represents the first double ply of fabric expanded into a single ply at the periphery thereof. B represents the second double ply similarly expanded but with the cords at an angle opposite to that in the layer A. C represents a single ply of fabric applied over the double ply B with the cords at an angle opposite to the cords in the ply B and D is another single ply of fabric with the cords oppositely arranged to the cords in the fabric C. F represents the tread of the tire.

It will be seen that by means of this process, I am to obtain a very uniform spacing of the cords about the periphery of the tire so that the cords are arranged at their most efficient angle, that the cords in the different layers are at proper angles with respect to each other, that the cords in each of the various layers are substantially parallel to each other due to the accurate alignment of the fabric on the drum, and that double plies of fabric are used to secure single layers of fabric in the expanded tire, with a sufficient cord count which is greater than could be obtained by using a single layer of fabric, even with the cords arranged closely together.

This method of construction will automatically result in a gradually thickened sidewall, the sidewall gradually becoming thicker toward the bead. This gives graduated stability in the lower sidewalls with a maximum in the bead region which is an advantage also. Due to the shaping and stretching of the tire, the thinnest portion of the carcass is at the periphery or in the position of maximum circumference. The radii of all other points in the tire section contour are in varying degrees of lesser radii and, therefore, a progressive crowding of material results naturally as the beads are approached, thereby gradually increasing the thickness of the sidewall.

I am aware that various processes have been devised for building the tires in which the cords are arranged somewhat as shown and described in this application, but these methods have been costly or unreliable as to the angular relation of the cord with respect to the tire, or with respect to each other. My invention contemplates primarily a simple and efficient means which is practical for building tires, for the time element is highly important in this art and the simple means which I have devised for aligning the cords and applying the aligned cords to a tire carcass is novel and practical.

Obviously, those skilled in the art to which this invention pertains, may make various changes in the particular arrangement and construction of the various parts used in building a tire according to this invention or vary the method used over that illustrated in the drawings without departing from the spirit of this invention or the scope of the claims hereunto appended.

Having thus fully described my invention, what I claim and desire to secure by Letters Patent of the United States is:

1. The method of building tires from cord fabric rubberized in the usual manner on a calender which comprises the steps of manually arranging the cords of a cord fabric on a rigid surface with the cords substantially parallel to each other, moving a tire building drum over said fabric at a definite angle with respect to said cords, holding said drum against said fabric with pressure whereby the tackiness of the material causes said fabric to adhere to said drum and cause said material to wrap itself therearound while maintaining a constant cord angle for all the cords with respect to the axis of the drum.

2. The method of building tires set forth in claim 1 which includes the additional step of forming a plurality of plies of such fabric with the cords all extending in the same direction and expanding the layers centrally of the periphery thereof to cause the cords of one such ply to interlie with the cords of an adjacent ply.

3. The method of building tires which comprises the steps of building a tire with a plurality of plies of cord fabric on a building drum and extending from bead area to bead area of the tire and in over-lapping relation with at least two adjacent plies having their cords running parallel with each other from bead area to bead area, and expanding the tire to cause the cords of each of said last-mentioned plies to at least partially lie between the cords in the other of the plies at the periphery of the tire to form in effect substantially a single ply at the periphery.

4. The method set forth in claim 3 in which at least two additional adjacent plies are arranged with the cords thereof parallel to each other but disposed at an opposite angle relative to the axis of the tire, than said first-mentioned two adjacent plies, the expanding of the tire causing the cords of each of said last two mentioned plies to lie between the cords in the other of the plies.

5. The method of building tires from cord fabric rubberized in the usual manner on a calender which comprises providing a strip of fabric with somewhat parallel cords, spaced ones of which are distinctively marked for quick identification, and applying the cord fabric to a surface, aligning the cords thereof parallel to each other on said surface by aligning the distinctively marked cords with suitable aligning indicia on said surface, and thereafter maintaining the parallel relation of said cords on said surface while said fabric is transferred to a building drum.

6. The method of building tires from cord fabric rubberized in the usual manner on a calender which comprises the steps of manually arranging a piece of fabric on a substantially inextensible surface with the cords of the fabric at a predetermined angle on said surface, and maintaining said fabric on said surface with the cords so arranged while transferring said fabric to a building drum with the cords maintained at the desired angle with respect to said drum during the application of said fabric to said drum by guiding said surface and drum relative to each other at a predetermined angle during the transfer of said fabric from said surface to said drum.

7. The method of building tires which comprises the steps of superimposing a plurality of layers of fabric of substantially the same width on a building drum with their cord angles extending in the same direction and with the cords extending from one bead area to the other, applying a second plurality of layers of fabric to a building drum with their cord angles extending in the same direction with respect to each other, but substantially oppositely to the cord angles of said first layers, applying a bead and tread to said tire carcass, expanding the carcass to the desired cross-section by suitable air bags causing the cords of the layers which have the same cord angles to lie at least partially between each other so that each plurality of plies form a single ply at the periphery of the tire.

8. A pressure-shaped pneumatic tire cover wherein, for the purpose specified, the carcass consists of at least four superposed plies of rubberized cord fabric cut on the bias, laid in successions of at least two with the cord threads of all the plies of each succession parallel to one another and extending from bead area to bead area, crossed relatively to those of an adjacent succession and in mutual interpenetration between one another at least at the periphery thereof, the threads of each ply into the rubber of the adjacent ply.

9. The method of building tires from cord fabric rubberized in the usual manner on a calender which comprises manually arranging the cords of a ply at the desired angle on a substantially inextensible surface and applying same to a building drum or the like while maintaining the cords on said surface at the desired angle relative to the surface of said drum until transferred to said drum.

10. The method of building tires from cord fabric rubberized in the usual manner on a calender comprising the steps of manually arranging the cords of bias-cut fabric substantially parallel to each other on a substantially inextensible work surface and of a length to envelop a tire building drum at least twice, and moving said drum and surface relative to each other at a definite angle to transfer all of the material to said drum whereby cords of successive layers of the same material lie parallel to each other and will interlie upon expansion of the tire carcass to substantially final shape.

RALPH B. DAY.